United States Patent [19]
Chiang

[11] Patent Number: 5,294,121
[45] Date of Patent: Mar. 15, 1994

[54] DIRECTION CONTROL KEY ASSEMBLY

[75] Inventor: Mao-Ting Chiang, Taoyuan, Taiwan

[73] Assignee: TXC Corporation, Taiwan

[21] Appl. No.: 76,576

[22] Filed: Jun. 14, 1993

[51] Int. Cl.[5] .......................... H01H 25/04; A63F 9/22
[52] U.S. Cl. ............................ 273/148 B; 200/5 R; 200/5 A; 200/339
[58] Field of Search ................ 273/148 B, 438; 200/5 R, 5 A, 6 R, 8 R, 17 R, 18, 329, 335, 339, 341; 340/709

[56] References Cited

U.S. PATENT DOCUMENTS

| | | | |
|---|---|---|---|
| 4,349,708 | 9/1982 | Asher | 273/438 X |
| 4,590,338 | 5/1986 | Suzuki | 200/5 R |
| 4,896,003 | 1/1990 | Hsieh | 200/339 X |
| 4,992,631 | 2/1991 | Gee | 200/339 X |
| 5,207,426 | 5/1993 | Inoue et al. | 273/148 B |

Primary Examiner—Vincent Millin
Assistant Examiner—Raleigh W. Chin
Attorney, Agent, or Firm—Ostrolenk, Faber, Gerb & Soffen

[57] ABSTRACT

A direction control key assembly comprises a base on which a cover is mounted to provide an interior space for receipt of a circuit board therein which has at least four switch units thereon respectively designating a specific direction. A button member is supported on the cover by a ball joint and has four pins depending therefrom respectively corresponding to the switch units such that when the button member is rotated with respect to the ball joint to allow one of the pins to engage and thus close the corresponding one of the switch units. A direction signal associated with the closed switch is thus generated.

5 Claims, 2 Drawing Sheets 5,294,121

DIRECTION CONTROL KEY ASSEMBLY

FIELD OF THE INVENTION

The present invention relates generally to a direction control key assembly particular for use in a video game controller.

BACKGROUND OF THE INVENTION

The direction control keys of a video game controller are provided for direction change of a video game displayed in a monitor or a television set. The conventional direction control key assembly comprises a circuit board on which four electrical contact pairs, serving as switch units, are symmetrically provided. A rubber pad covers the circuit board, as well as the electrical contacts, having four nipple-like, hollow raised portions for the receipt therein electrical conductive members to bridge over the contact pairs to form closed loop circuits. Actuation means is provided above the rubber pad to independently actuate one or a combination of the switch units to send out direction signals associated with the specific directions designated by the closed switch units.

One of its disadvantages is the fatigue of the rubber pad. Once the fatigue occurs, the direction control key assembly may not work properly.

A co-pending U.S. Patent application Ser. No. 08/000,633, filed on Jan. 5, 1993 under the name of the applicant of the present invention discloses a direction control key assembly which adapts a cruciform direction control key structure having two elongated members straddling over each other with pivot joint therebetween. Such a direction control key assembly, although helpful in improving the operation and endurance of the direction control key assembly, is complicated in structure and thus costly in manufacturing.

It is therefore desirable to provide a direction control key assembly which overcomes the above mentioned problems.

SUMMARY OF THE INVENTION

It is therefore the principal object of the present invention to provide a direction control key assembly which comprises a button supported by a ball joint on a circuit board with four pins depending therefrom such that the button is depressingly rotatable with respect to the ball joint to allow the pins to engage and thus actuate the corresponding electrical switches provided on the circuit board to generate direction signals corresponding to the actuated switches.

To achieve the above object, there is provided a direction control key assembly comprising a base on which a cover is mounted to provide an interior space for receipt of a circuit board therein which has at least four switch units thereon respectively designating a specific direction. A button member is supported on the cover by a ball joint and has four pins depending therefrom respectively corresponding to the switch units such that when the button member is rotated with respect to the ball joint to allow one of the pins to engage and thus close the corresponding one of the switch units. A direction signal associated with the closed switch is thus generated.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
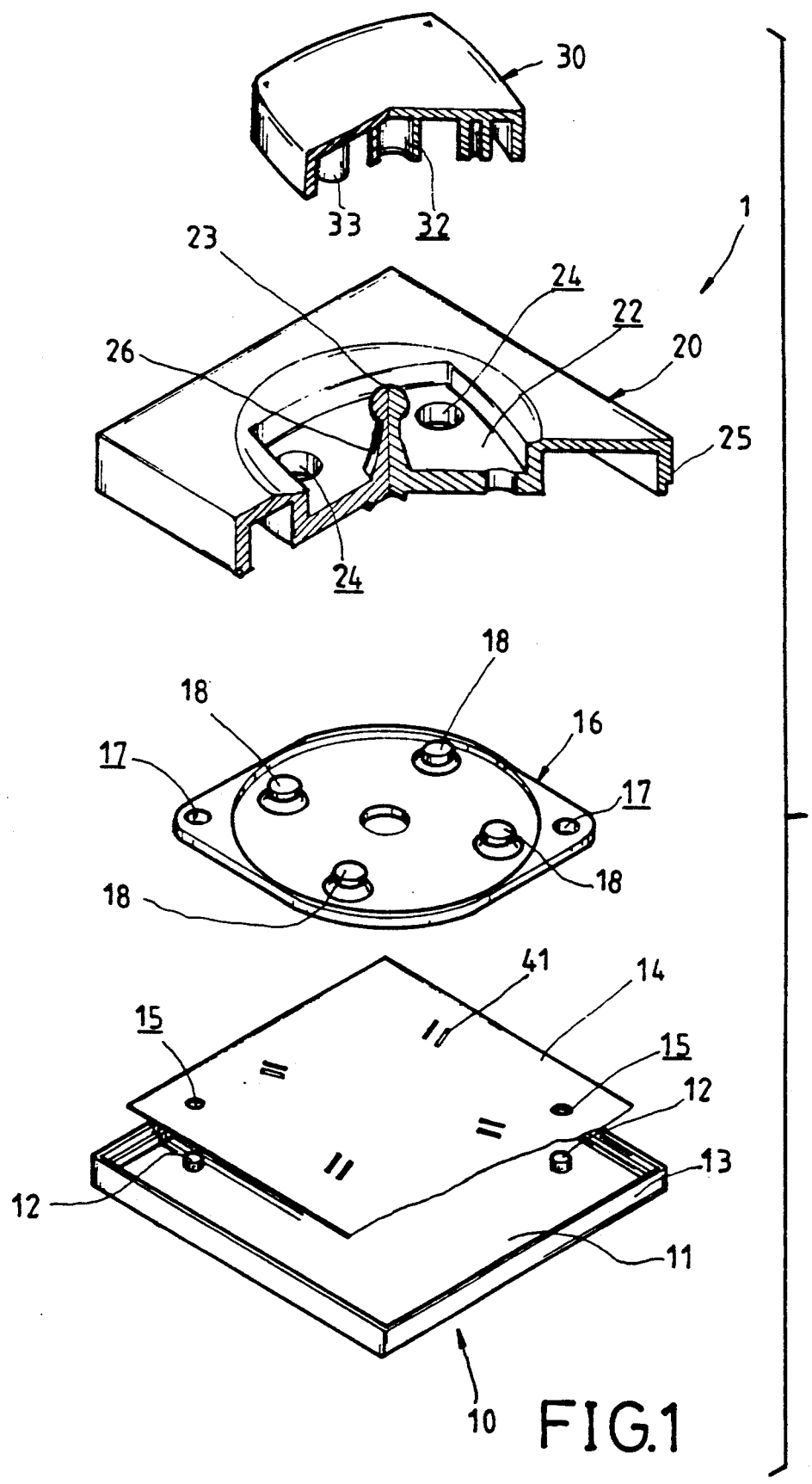
FIG. 1 is a perspective view showing a direction control key assembly constructed in accordance with the present invention with a portion thereof broken to show the structure thereof.
Figure 2:
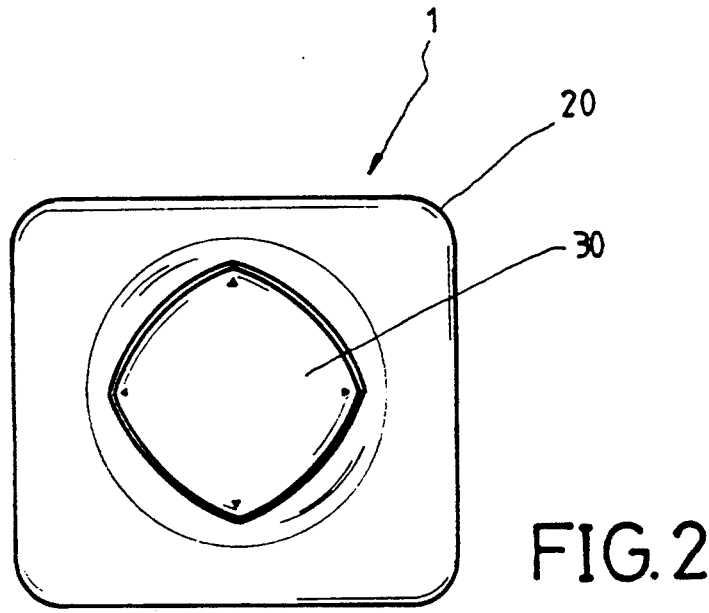
FIG. 2 is a top plan view showing the direction control key assembly constructed in accordance with the present invention.

With reference to the drawings and in particular to FIG. 1, wherein a direction control key assembly, generally designated by the reference numeral 1, is shown, the direction control key assembly 1 comprises a base 10 having a bottom plate 11, preferably rectangular, on which a plurality of dowel pins 12, for example two in the illustrated embodiment, are formed. A perpendicular flange 13 is formed around the periphery of the bottom plate 13.

On the base 10, a printed circuit board 14 which has a number of holes 15 corresponding to the dowel pins 12 disposed thereon to receive the dowel pins 12 therein for correctly placing the circuit board 14 on the bottom plate 11.

As is known to those skilled in the art, at least four switch units, respectively corresponding to the NORTH, SOUTH, EAST and WEST directions are provided on the circuit board 14 and once actuated, a corresponding direction signal is generated. An example of the switch units comprises, for each of the switch units, a pair of contacts 41 provided on the circuit board 14 which are bridgingly contacted by a corresponding conductive member 42 (see FIG. 3) to form a close circuit for the generation of the direction signal.

Preferably, the conductive members 42 are mounted on a rubber pad 16. The rubber pad 16 may comprise four nipplelike raised portions 18, each having a hollow interior to receive a corresponding conductive member 42 therein so as to leave a gap between the conductive member 42 and its corresponding contact pair 41. The elasticity of the rubber pad 16 provides a biasing means to the conductive members 42 to have the conductive members 42 separate from the contact pairs 41 in spatial relationship.

The rubber pad 16 may also be provided with a number of holes 17 to receive the dowel pins 12 therein for correctly positioning the rubber pad 16 on the circuit board 14.

A cover 20 is mounted to the base 10 to form a casing defining therein an interior space for receiving therein the circuit board 14 and the rubber pad 16. A number of through holes 24, corresponding to the switch units of the circuit board 14, are formed on the cover 20 to respectively receive therein the raised portions 18 of the rubber pad 16. The cover 20 may be provided with a perpendicular flange 25 to be jointed to the flange 13 of the base 10 to form a side wall of the direction control key assembly 1.

On the cover 20, a rod 26 is formed substantially on a center thereon and extending therefrom such that the through holes 24 are symmetrically disposed around the rod 26. An expanded spherical portion 23 is provided on a remote end of the rod 26.

A button member 30 is disposed above the cover 20 and supported by the rod 26. The button member 30 comprises a recess 32 centered on the underside of the button member 30 to receive therein the expanded spherical end 23 of the rod 26 so as to form a ball joint between the cover 20 and the button member 30. The ball joint allows the button member 30 to be depressingly rotatable with respect to the cover 20 along any desired orientation.

Figure 3:
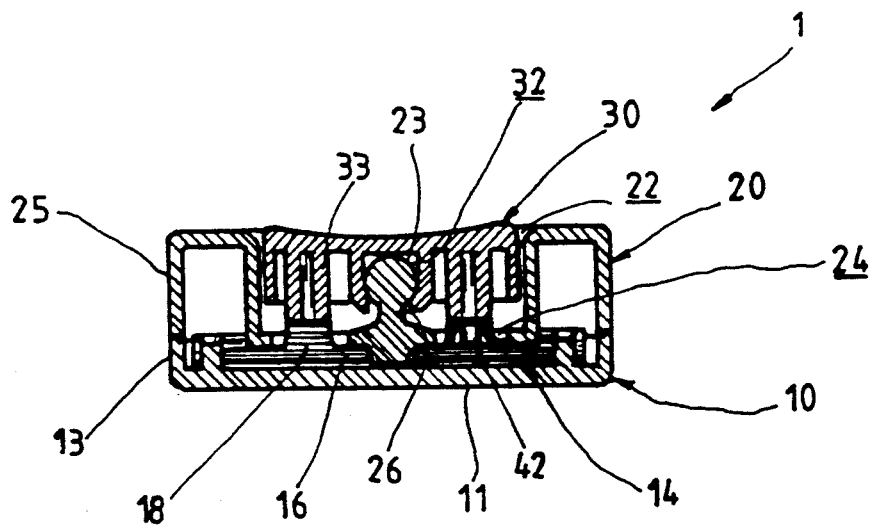
FIG. 3 is a cross-sectional view showing the present inventive direction control key assembly.

Preferably, the cover 20 has a central recessed portion 22 formed on the top surface thereof to have the central rod 26 and the four holes 24 disposed therein and to receive the button member 30 therein, as shown in FIG. 3.

The button member 30 comprises a number of depending pins 33 formed on the underside thereof in correspondence to the through holes 24 formed on the cover 20 and the switch units provided on the circuit board 14 so that when the button member 30 is depressed and thus rotated with respect to the cover 20, one or a combination of the depending pins 33 is moved toward the corresponding switch unit to actuate the switch unit. Due to the elasticity of the rubber pad 16, once the button member 30 is released, the switch unit will be automatically de-actuated.

With such a structure described above, a direction control key assembly which is simple in construction and durable in operation is provided. It is apparent that although the invention has been described in connection with the preferred embodiment, it is contemplated that those skilled in the art may make changes to certain features of the preferred embodiment without altering the basic concept of the invention and without departing from the spirit and scope of the invention as defined in the appended claims.

What is claimed is:

1. A direction control key assembly comprising a casing having a base with a cover mounted thereon to provide an interior space to receive therein a circuit board having a number of switch units mounted thereon, said cover having a rod located on a central position thereof and extending therefrom with an expanded spherical portion formed on a remote end thereof, said cover further comprising a number of through holes, corresponding to the switch units, symmetrically disposed around said rod, and a button member having a recess formed on an underside thereof to receive the expanded end of said rod therein, forming a ball joint between said button member and said cover to allow said button member to be depressingly rotatable with respect to said cover, said button member further comprising a number of depending pins formed on the underside thereof, corresponding to the through holes formed on said cover so that when said button member is rotated with respect to said cover, a combination of the depending pins is allowed to engage and thus actuating the corresponding switch units provided on said circuit board through the through holes to generate direction signals corresponding to the actuated switch units.

2. A direction control key assembly as claim in claim 1, wherein each of said switch units further comprises a biasing means to separate the depending pin from the switch unit to provide an open loop condition of the switch unit when said button member is not actuated.

3. A direction control key assembly as claimed in claim 2, wherein said biasing means comprises a rubber pad which has a raised portion corresponding to each of the depending pins and received within the corresponding through hole of said cover to prevent the depending pins from engaging said switch units through the through hole when said button member is not actuated.

4. A direction control key assembly as claimed in claim 3, wherein each of said switch unit comprises a pair of contacts formed on said circuit and wherein each of the raised portions of said rubber pad defines a hollow interior to receive therein a conductive member which is disposed facing said contact pair so that when said button member is actuated to have the depending pins to contact and thus depressing the raised portions of said rubber pad, the conductive members provide electrical bridging members between the contact pairs to form close loop circuits for generation of the direction signals.

5. A direction control key assembly as claimed in claim 1, wherein said cover comprises a recessed portion formed thereon to allow the rod and the holes to be disposed in the recessed portion and to substantially receive the button member therein and to allow the button member to be operated therein.

* * * * *